(12) United States Patent
Lee

(10) Patent No.: US 7,486,609 B2
(45) Date of Patent: Feb. 3, 2009

(54) EUROPEAN DIGITAL AUDIO BROADCAST RECEIVER HAVING A SIMPLY IMPLEMENTABLE FAST FOURIER TRANSFORM PROCESSOR AND AN OPERATION METHOD THEREFOR

(75) Inventor: Jeong-sang Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 950 days.

(21) Appl. No.: 10/626,740

(22) Filed: Jul. 25, 2003

(65) Prior Publication Data

US 2004/0160894 A1 Aug. 19, 2004

(30) Foreign Application Priority Data

Dec. 12, 2002 (KR) .................. 10-2002-0079293

(51) Int. Cl.
*H04J 11/00* (2006.01)
(52) U.S. Cl. .................. 370/210; 708/404; 708/405
(58) Field of Classification Search .................. 708/403, 708/404, 405; 370/203, 208, 210
See application file for complete search history.

(56) References Cited

U.S. PATENT DOCUMENTS

| | | | | |
|---|---|---|---|---|
| 4,393,457 A | * | 7/1983 | New ........................ | 708/404 |
| 4,959,776 A | * | 9/1990 | Deerfield et al. ........... | 711/217 |
| 5,224,063 A | * | 6/1993 | Matsunaga ................ | 708/404 |
| 5,491,652 A | * | 2/1996 | Luo et al. ................. | 708/404 |
| 5,633,817 A | * | 5/1997 | Verhenne et al. ........... | 708/404 |
| 6,907,439 B1 | * | 6/2005 | Wicker ..................... | 708/404 |
| 6,976,047 B1 | * | 12/2005 | Rachakonda ............... | 708/404 |
| 7,010,027 B1 | * | 3/2006 | Mestdagh et al. .......... | 375/222 |

FOREIGN PATENT DOCUMENTS

WO    WO 00/31938 A1    6/2000

OTHER PUBLICATIONS

On Computing the fast Fourier transform, by Richard C. Singleton (ACM press) Oct. 1967.*
S.B. Weinstein, "Data Transmission by Frequency-Division Multiplexing Using the Discrete Fourier Transform", IEEE Transactions on Communication Technology, vol. com-19, No. 5, Oct. 1971.

* cited by examiner

*Primary Examiner*—Ricky Q. Ngo
*Assistant Examiner*—Dady Chery
(74) *Attorney, Agent, or Firm*—Sughrue Mion, PLLC

(57) ABSTRACT

Disclosed is a European digital audio broadcast receiver having a simply implementable fast Fourier transform processor and an operation method therefor. A digital audio broadcast receiver having diverse fast Fourier transform (FFT) modes based on sizes of transmitted data has an address generator for generating a predetermined number of write addresses and read addresses, a fast Fourier transform (FFT) processor for repeating data of FFT modes to generate a predetermined number of data and implementing a fast Fourier transform (FFT) by using the predetermined number of data, and a controller for controlling the address generator to the write addresses and the read addresses according to operations of the FFT processor.

22 Claims, 12 Drawing Sheets

MEMORY READ ADDRESS

INTERNAL READ ADDRESS

MEMORY READ ADDRESS

INTERNAL READ ADDRESS

MEMORY READ ADDRESS

INTERNAL READ ADDRESS

MEMORY READ ADDRESS

INTERNAL READ ADDRESS

EUROPEAN DIGITAL AUDIO BROADCAST RECEIVER HAVING A SIMPLY IMPLEMENTABLE FAST FOURIER TRANSFORM PROCESSOR AND AN OPERATION METHOD THEREFOR

BACKGROUND OF THE INVENTION

1. Field of the Invention

The present invention relates to a European digital broadcast receiver, and more particularly to a fast Fourier transform (FFT) processor. The present application is based on Korean Patent Application No. 2002-79293, which is incorporated herein by reference.

2. Description of the Prior Art

It is a trend with digital technology developments that broadcast methods are shifting from analog methods to digital methods. Some radio broadcasts have been done with digital transmission, while others are in preparation for digital transmission. The European digital audio broadcasts (DABs) employ orthogonal frequency division multiplexing (OFDM) for broadcast transmissions, and a fast Fourier transform (FFT) processor employed for the OFDM has FFT modes such as 256, 512, 1024, 2048, and so on, depending upon the number of input data.

The conventional fast Fourier transform processor has a memory address generation algorithm and a data butterfly operation algorithm, which are different, depending upon respective FFT modes for the fast Fourier transform.

For example, U.S. Pat. No. 6,035,313 entitled "Memory Address Generator for an FFT" applies the memory address generation algorithm in different ways depending upon respective FFT modes, which causes a problem of complicated process and implementation.

In the meantime, in general, there are the Radix-2 algorithm capable of processing input data of $2^n$ FFT such as 256, 512, 1024, 2048, and so on, and the Radix-4 algorithm capable of processing input data of $4^n$ FFT such as 256, 1024, and so on, for the fast Fourier transform algorithms. The Radix-2 algorithm has a disadvantage in that it has a relatively slow processing rate compared to the Radix-4 algorithm. Also, although the Radix-4 algorithm can process the input data of the $4^n$ FFT modes of 256, 1024 and so on, the Radix-4 algorithm has a disadvantage in that it can not process the input data of the $2^n$ FFT modes of 512, 2048, and so on. In order to solve the above-described problem, the U.S. Pat. No. 5,473,556 entitled "Digit Reverse for Mixed Radix FFT" provides a mixed Radix structure combining the Radix-2 structure and the Radix-4 structure for the algorithm structure.

However, such an algorithm structure combining the Radix-2 structure and the Radix-4 structure also has a problem of complicated implementation.

SUMMARY OF THE INVENTION

In order to solve the above problems, it is an object of the present invention to provide a European digital audio broadcast receiver having a fast Fourier transform processor which is efficient and simply implementable and an operation method therefor.

In order to achieve the above object, a European digital audio broadcast receiver having diverse fast Fourier transform modes (FFTs) based on sizes of transmitted data according to the present invention comprises an address generator for generating the predetermined number of write addresses and read addresses; a fast Fourier transform (FFT) processor for repeating data of FFT modes to generate the predetermined number of data and implementing a fast Fourier transform (FFT) by using the predetermined number of data; and a controller for controlling the address generator to the write addresses and the read addresses according to operations of the FFT processor.

The predetermined number is 4096, and the FFT processor uses the 4096 data to implement the fast Fourier transform.

The FFT processor includes a memory controller for repeating the data of FFT modes to generate 4096 data; a memory having a size capable of storing 2048 data; and an algorithm unit for using the 4096 data and implementing Radix-4 based operations, and, in the case that the read addresses are generated, the memory controller digit-reverses the addresses of the memory in correspondence to the read addresses.

The memory controller has a virtual memory storing data other than the 2048 data stored in the memory in order for the algorithm unit to implement the Radix-4 based operations, the algorithm unit implements the Radix-4 based operations, and, accordingly, "0" data blocks are stored in the virtual memory in correspondence to the FFT modes.

The memory controller digit-reverses the data operated on based on the Radix-4 algorithm and stored in the memory corresponding to the FFT modes.

In the case that a bit array of the read addresses from a highest bit to a lowest bit has $\{a_{11}, a_{10}, a_9, a_8, a_7, a_6, a_5, a_4, a_3, a_2, a_1, a_0\}$ in 2048 FFT mode, the memory controller digit-reverses the bit array of the memory addresses from the highest bit to the lowest bit into $\{a_1, a_3, a_2, a_5, a_4, a_7, a_6, a_9, a_8, a_{11}, a_{10}\}$.

In the case that a bit array of the read addresses from a highest bit to a lowest bit has $\{a_{11}, a_{10}, a_9, a_8, a_7, a_6, a_5, a_4, a_3, a_2, a_1, a_0\}$ in 1024 FFT mode, the memory controller digit-reverses the bit array of the memory addresses from the highest bit to the lowest bit into $\{0, a_3, a_2, a_5, a_4, a_7, a_6, a_9, a_8, a_{11}, a_{10}\}$.

In the case that a bit array of the read addresses from a highest bit to a lowest bit has $\{a_{11}, a_{10}, a_9, a_8, a_7, a_6, a_5, a_4, a_3, a_2, a_1, a_0\}$ in 256 FFT mode, the memory controller digit-reverses the bit array of the memory addresses from the highest bit to the lowest bit into $\{0, 0, 0, a_5, a_4, a_7, a_6, a_9, a_8, a_{11}, a_{10}\}$.

In the case that a bit array of the read addresses from a highest bit to a lowest bit has $\{a_{11}, a_{10}, a_9, a_8, a_7, a_6, a_5, a_4, a_3, a_2, a_1, a_0\}$ in 512 FFT mode, the memory controller digit-reverses the bit array of the memory addresses from the highest bit to the lowest bit into $\{0, a_3, 0, a_5, a_4, a_7, a_6, a_9, a_8, a_{11}, a_{10}\}$.

In the meantime, an operation method for a European digital audio broadcast receiver having diverse FFT modes based on sizes of transmitted data according to the present invention comprises steps of generating the predetermined number of write addresses; repeating data of FFT modes to generate the predetermined number of data in correspondence to the write addresses, and implementing a fast Fourier transform (FFT) by using the predetermined number of data; and generating the read addresses if the operation of the FFT step is completed.

The predetermined number is 4096, and the FFT step uses the 4096 data to implement the fast Fourier transform.

The FFT step includes steps of repeating the data of FFT modes to generate 4096 data; using the 4096 data to implement Radix-4 based operations, and storing the implemented data in the memory in correspondence to the addresses of the memory; and digit-reversing, in the case that the read addresses are generated, the read addresses to the addresses of the memory corresponding to the read addresses.

The operation method further comprises a step of storing the 4096 data repeated in the operation step in the memory and the virtual memory for the Radix-4 based operations, and, according to a result of the operations of the operation step, "0" data blocks are stored in the virtual memory in correspondence to the FFT modes.

The digit-reversing step digit-reverses the data operated on based on the Radix-4 algorithm and stored in the memory corresponding to the FFT modes.

The present invention has a fast Fourier transform processor of the same structure with respect to 2048, 1024, 256, and 512 FFT modes for the European digital audio broadcasts, to thereby simplify its hardware implementation. Further, the implementation of a fast Fourier transform processor having the same structure with respect to the respective FFT modes simplifies the operation controls of the fast Fourier transform.

BRIEF DESCRIPTION OF THE DRAWINGS

The present invention will be described in detail with reference to the following drawings in which like reference numerals refer to like elements, and wherein:

FIG. 2A to FIG. 2C are views for explaining an interpolation method applied to the receiver of FIG. 1;

DETAILED DESCRIPTION OF THE PREFERRED EMBODIMENT

Hereinafter, the present invention will be described in more detail.

A fast Fourier transform processor for a European digital audio broadcast receiver according to the present invention has properties as follows:

(1) The same Radix-4 algorithm is carried out with respect to diverse input data modes such as 2048, 1024, 256, and 512 for FFT computations so that the implementation of an algorithm unit for a FFT processor is simplified.

(2) an address generator generates 4096 addresses to apply the Radix-4 algorithm to diverse FFT modes.

(3) Interpolation is done with 2048, 1024, 256, and 512 input data of diverse FFT modes into 4096 in use of the FFT duality property to prevent the increase of memory for a fast Fourier transform processor according to the 4096 addresses.

(4) The Radix-4 algorithm is done in use of the interpolated 4096 data, and the digit-reverse function corresponding to each FFT mode is applied for digit-reversing.

Hereinafter, the above characteristics of the present invention will be described in detail with reference to the drawings.

Figure 1:
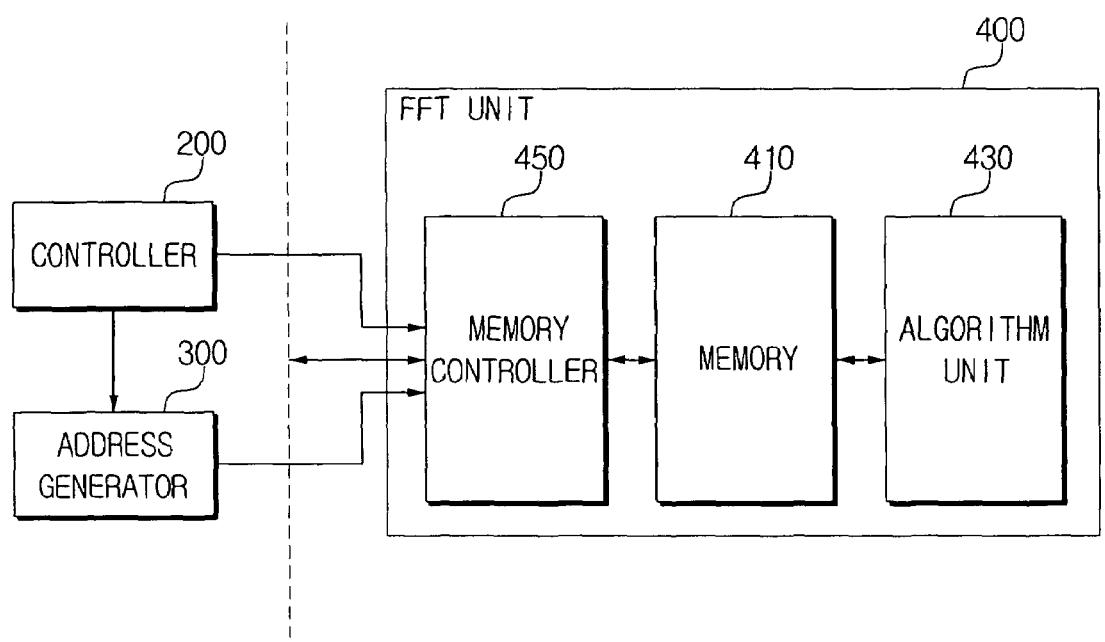
FIG. 1 is a block diagram for schematically showing a European digital audio broadcast receiver according to an embodiment of the present invention.

FIG. 1 is a block diagram for schematically showing a European digital audio broadcast (DAB) receiver according to a preferred embodiment of the present invention, which has a receiver (not shown) receiving digital audio broadcast signals, a controller 200, an address generator 300, and a fast Fourier transform (FFT) unit 400.

The receiver receives digital audio broadcast signals transmitted from a transmitter, and the FFT modes of the received broadcast signals are 2048, 1024, 512, and so on.

The controller 200 controls the overall operations of the DAB receiver, and controls the FFT unit 400 to implement the fast Fourier transform (FFT) in correspondence to the FFT modes of input data received from the receiver 100.

The address generator 300 generates 4096 addresses in correspondence to a control signal of the controller 200. That is, the address generator 300 generates read and write addresses to implement the FFT of the FFT unit 400.

The FFT unit 400 has a memory 410 of a size corresponding to 2048 data, an algorithm unit 430 for implementing Radix-4 based butterfly operations, and a memory controller 450. The memory controller 450 stores in the memory 410 data corresponding to the FFT modes of input data based on 4096 addresses generated from the address generator 300 to implement the Radix-4 based operations, and re-stores in the memory 410 data repeatedly implemented based on the Radix-4 algorithm in the algorithm unit 430.

In the meantime, the memory controller 450 digit-reverses the data implemented based on the Radix-4 algorithm and re-stored in the memory 410, and outputs the re-stored data. That is, the memory controller 450 digit-reverses the addresses of the memory 410 in correspondence to the read addresses generated from the address generator 300 according to a control signal of the controller 200 and then outputs predetermined data.

The operation principles [1] and [2] of the FFT unit according to an embodiment of the present invention will be described in detail with reference to the drawings and equations.

[1] Interpolation is applied to the FFT unit.

When x (n) denotes input data and X (m) denotes a result of the FFT of x (n), the relation between the x (n) and X (m) can be established as Equation 1.

$$X(m) = \sum_{n=0}^{N-1} x(n) W_N^{-m} \text{ where, } W_n^{-m} = e^{-j\frac{2\Pi nm}{N}} \quad \text{[Equation 1]}$$

The input data x (n) can be expressed as in Equation 2 with an application of an interpolation upsampling process, which is one of the signal processing methods.

$$x(m)=x(n/L), n=0\pm L, \pm 2L, \ldots 0, \text{otherwise} \quad \text{[Equation 2]}$$

Equation 2 can be expressed in Equation 3.

$$x(n) = \sum_{k=0}^{\frac{N}{L}-1} x(k) \cdot \delta(n - kL), \quad \text{[Equation 3]}$$

$$\text{where } 0 \leq n \leq N - 1, N = 2^M$$

Wherein the N denotes the number of input data to be processed, and Equation 3 can be expressed in Equation 4 through the FFT.

$$\begin{aligned}X_i(m) &= \sum_{n=0}^{N-1}\left(\sum_{k=0}^{\frac{N}{L}-1} x(k) \cdot \delta(n - kL)\right) W_N^{-m} \quad \text{[Equation 4]}\\ &= \sum_{k=0}^{\frac{N}{L}-1} x(k) \left(\sum_{k=0}^{N-1} \delta(n - kL) \cdot W_N^{-m}\right)\\ &= \sum_{k=0}^{\frac{N}{L}-1} x(k) \cdot e^{-j\frac{2\pi kLm}{N}}\\ &= \sum_{k=0}^{\frac{N}{L}-1} x(k) \cdot W_{\frac{N}{L}}^{-k}\end{aligned}$$

Comparing an FFT result preceding the interpolation in each interval m based on the above equation 4 shows a certain periodical repetition. First of all, in case of values m with $0 \leq m < N/L-1$, the result of the above Equation shows equals the FFT result preceding the interpolation. In case of the values m with $N/L \leq m < 2N/L-1$, the following Equation 5 is applied.

$$\begin{aligned}X_i\left(\frac{N}{L}+l\right) &= \sum_{k=0}^{\frac{N}{L}-1} x(k) \cdot e^{-j\frac{2\pi k(\frac{N}{L}+l)}{\frac{N}{L}}}, \text{ where, } 0 \leq l \leq \frac{N}{L} - 1 \quad \text{[Equation 5]}\\ &= \sum_{k=0}^{\frac{N}{L}-1} x(k) \cdot e^{-j\frac{2\pi kl}{\frac{N}{L}}}\end{aligned}$$

Referring to Equation 5, the FFT result preceding the interpolation is the same.

As described above with Equations 1 to 5, upsampling with a certain coefficient and fast-Fourier-transforming time domain data, the data preceding the interpolation results in repetitive data preceding the interpolation by the upsampled coefficient.

Figures 2A, 2B, 2C:
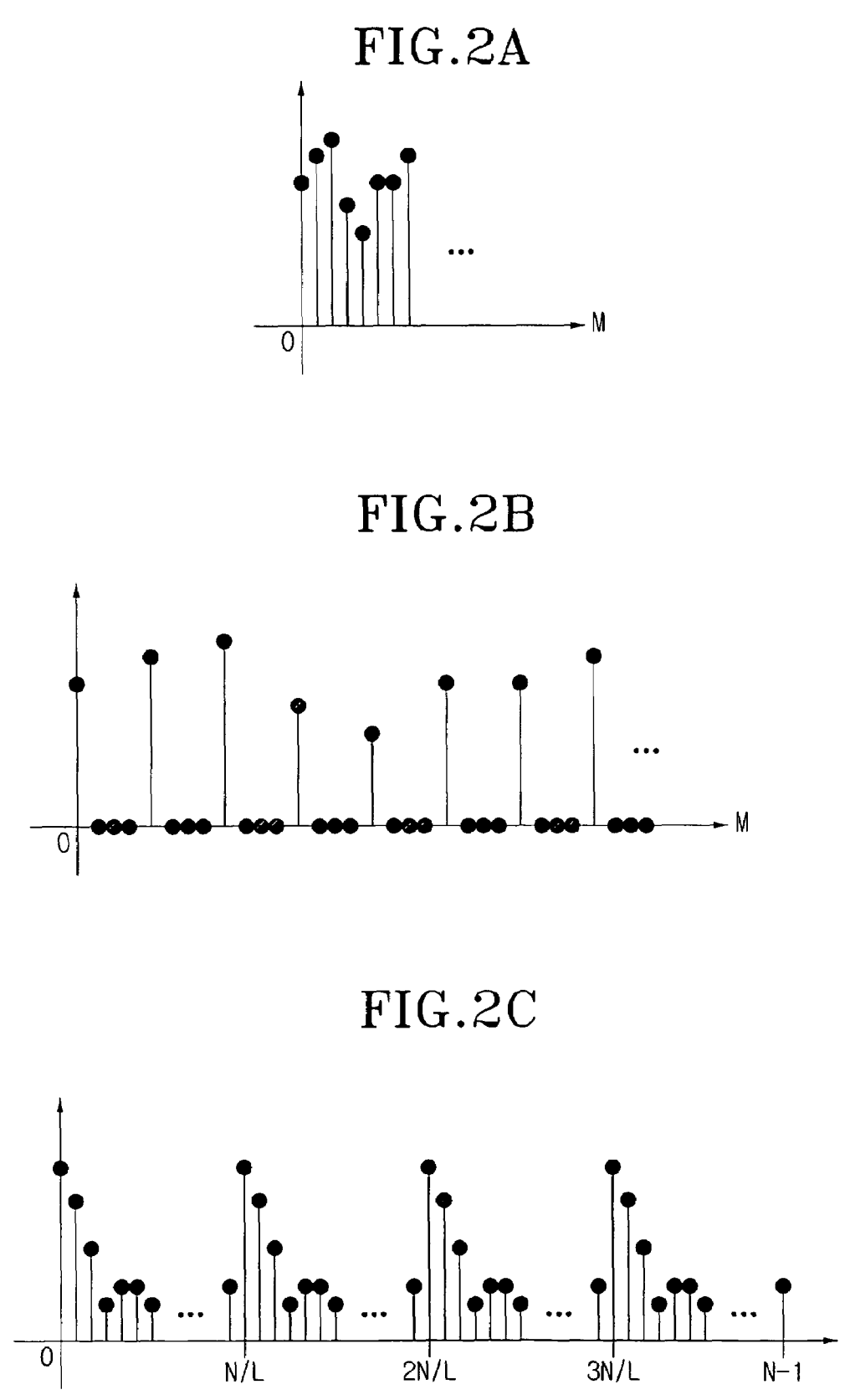

The FFT result based on the interpolation is described with reference to the spectrum diagrams shown in FIG. 2A to FIG. 2C. First, FIG. 2A shows a spectrum diagram of input data in time domain in case of a 1024 FFT mode. The 1024 input data shown in FIG. 2A is upsampled by 4 to 4096 data as shown in FIG. 2B. Thereafter, the 4096 data shown in FIG. 2B is fast-Fourier-transformed to convert time domain data into frequency domain data. That is, the 4096 data is four times repeated with a period of the 1024 input data preceding the interpolation.

In the meantime, the fast Fourier transform has the duality property. The duality property is the property that, when X (m) is referred to as an FFT result of x (n), an FFT result of X (m) becomes the x (n).

If the fast Fourier transform is done with the interpolation that four times repeats the 1024 input data of time domain, data of 3 zeros is inserted and distributed between the 1024 input data in frequency domain according to the FFT duality property (refer to FIG. 2B).

The application of the interpolation according to such a duality property is described below.

In order for an FFT processor to perform the same Radix-4 algorithm on diverse input data modes such as 2048, 1024, 256, and 512, the address generator 300 generates the same addresses from 0 to 4095 for 2048, 1024, 256, and 512 input data. According to this, the memory controller 450 interpolates the diverse input data to 4096 data. That is, the memory controller 450 repeats the interpolation on the input data twice for the 2048 mode, four times for the 1024 mode, 16 times for the 256 mode, and 8 times for the 512 mode.

Accordingly, the memory 410 capable of storing 2048 data stores data corresponding to the addresses from 0 to 2047 from the data addressed 0 to 4095. At this time, the memory controller 450 stores, in a virtual memory, data corresponding to the addresses from 2048 to 4095. That is, the data substantially stored in the memory 410 are data addressed from 0 to 2047, and the rest of the data addressed from 2048 to 4095 is not stored in the memory 410 but acknowledged by the memory controller 450 only.

As above, the algorithm unit 430 implements butterfly operations based on the Radix-4 algorithm with 4096 data stored in the memory 410 and the virtual memory of the memory controller 450.

Figure 3:
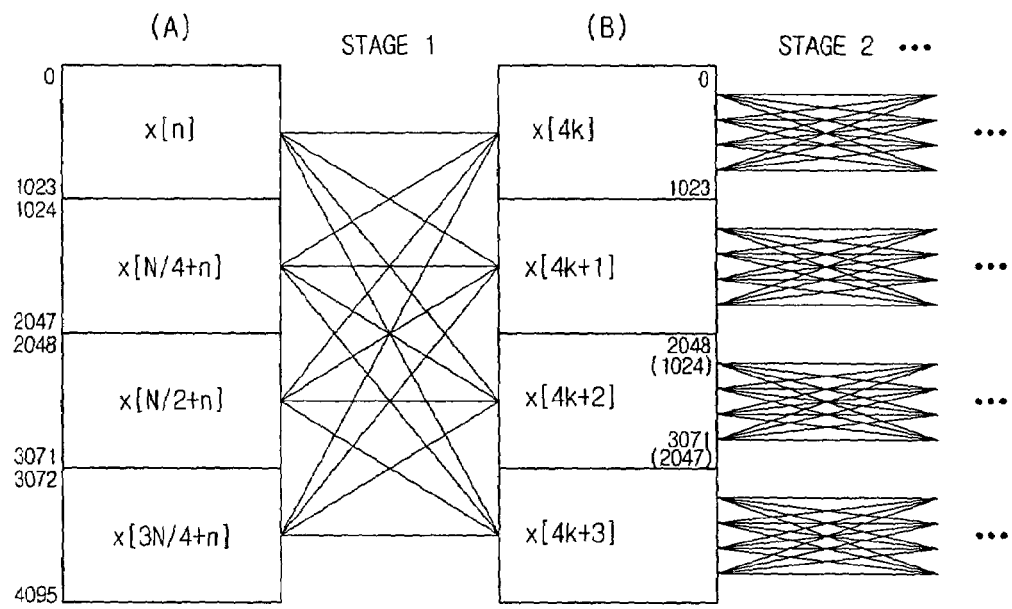
FIG. 3 is a conceptual view for explaining an algorithm process based on the Radix-4 algorithm in the algorithm unit 430 of FIG. 1.

FIG. 3 is a conceptual view for explaining the butterfly operations based on the Radix-4 algorithm, and the operations based on the Radix-4 algorithm can be expressed in Equation 6 below with reference to FIG. 3.

$$X(4k) = x(n) + x\left(\frac{N}{4}+n\right) + x\left(\frac{N}{2}+n\right) + x\left(\frac{3N}{4}+n\right) \quad \text{[Equation 6]}$$

$$X(4k+1) = x(n) - j \cdot x\left(\frac{N}{4}+n\right) - x\left(\frac{N}{2}-n\right) + j \cdot x\left(\frac{3N}{4}+n\right)$$

$$X(4k+2) = x(n) - x\left(\frac{N}{4}-n\right) + x\left(\frac{N}{2}-n\right) - x\left(\frac{3N}{4}+n\right)$$

$$X(4k+3) = x(n) + j \cdot x\left(\frac{N}{4}+n\right) - x\left(\frac{N}{2}+n\right) - j \cdot x\left(\frac{3N}{4}+n\right)$$

Hereinafter, descriptions will be made on an operation process based on the Radix-4 algorithm for the respective 2048, 1024, 256, and 512 FFT modes in the algorithm unit 430 with reference to the drawings and equations.

Figure 4:
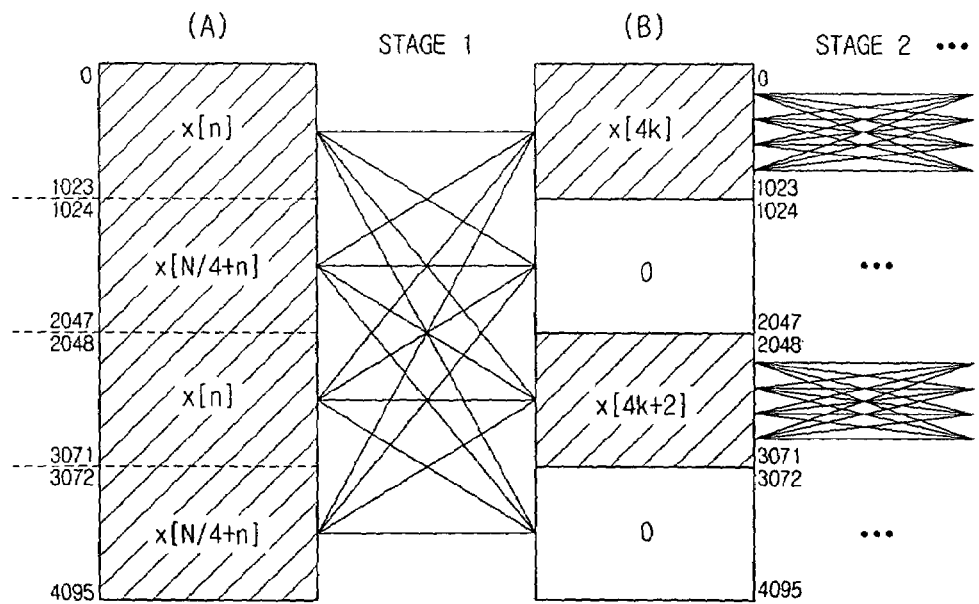
FIG. 4 is a view for showing the distributions of data stored in the memory 410 based on the Radix-4 algorithm in the case that the receiver of FIG. 1 has a 2048 FFT mode.

First, detailed descriptions will be made on an operation process based on the Radix-4 algorithm in the 2048 mode with reference to FIG. 4.

Received 2048 input data is stored in the memory 410 of the fast Fourier transform process 400. Thereafter, if a control signal for a fast Fourier transform is inputted to the address generator 300 from the controller 200, the address generator 300 generates 4096 addresses. The memory controller 450 stores interpolated 4096 data in the memory 410 and the virtual memory in correspondence to 4096 addresses. That is, the memory controller 450 stores 2048 input data from 0 to 2047 in the 4096 address structure shown in (A) of FIG. 4, and stores 2048 input data addressed from 2048 to 4095 in the virtual memory.

Thereafter, the algorithm unit 430 implements the butterfly operations based on the Radix-4 algorithm. In general, the Radix-4 algorithm repeats the butterfly operations as many times as $\log_4$ (FFT size) for the entire data. Accordingly, the butterfly operations are implemented 6 times for the 4096 data. An operation result can be expressed as in Equation 7 below, and 4096 data accordingly operated are re-stored as shown in (B) of FIG. 4.

$$X(4k) = x(n) + x\left(\frac{N}{4} + n\right) + x(n) + x\left(\frac{N}{4} + n\right)$$

$$X(4k+1) = x(n) - j \cdot x\left(\frac{N}{4} + n\right) - x(n) + j \cdot x\left(\frac{N}{4} + n\right) = 0$$

$$X(4k+2) = x(n) - x\left(\frac{N}{4} + n\right) + x(n) - x\left(\frac{N}{4} + n\right)$$

$$X(4k+3) = x(n) + j \cdot x\left(\frac{N}{4} + n\right) - x(n) - j \cdot x\left(\frac{N}{4} - n\right) = 0$$

[Equation 7]

As shown in the operation result of Equation 7, if interpolated 4096 data is implemented with the Radix-4 algorithm, data exist only in the addresses of X (4k) and X (4k+2) out of total 4096 addresses, and only "0" exists in the addresses of X (4k+1) and X (4k+3). The operations for the entire stages result in the presence of data in the addresses of X (4k) and X (4k+2) only. Accordingly, the memory 410 has 2048 data re-stored in correspondence to the addresses of X (4k) and X (4k+2).

Second, detailed descriptions will be made on an operation process based on the Radix-4 algorithm in the 1024 mode with reference to FIG. 5.

The address generator 300 generates 4096 addresses and the interpolated 4096 data corresponding to the 4096 address structure is stored in the memory 410 and the virtual memory. That is, as shown in (A) of FIG. 5, 1024 data is four times repeated and stored in the addresses from 0 to 4096. At this time, the virtual memory of the memory controller 450 has addresses from 2048 to 4095 , and 2048 data stored in the virtual memory becomes data acknowledged by the memory controller 450 only.

Figure 5:
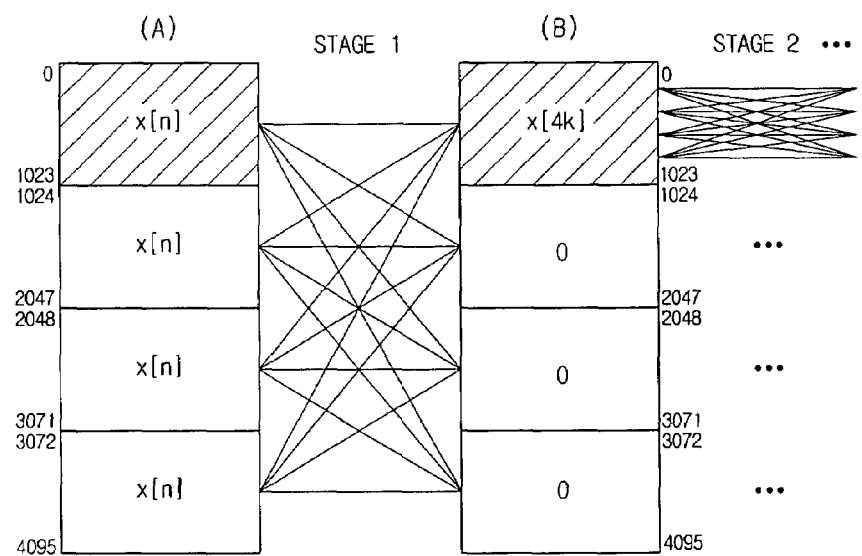
FIG. 5 is a view for showing the distributions of data stored in the memory 410 based on the Radix-4 algorithm in the case that the receiver of FIG. 1 has a 1024 FFT mode.

As above, the interpolated 4096 data is the same as shown in (A) of FIG. 5, and the algorithm unit 430 implements the butterfly operations based on the Radix-4 algorithm in use of 4096 data. The result of the stage operation with the Radix-4 algorithm can be expressed as the Equation 8 below, and the subsequently re-stored data in 4096 address structure is the same as shown in (B) of FIG. 5.

$$X(4k) = x(n) + x(n) + x(n) + x(n) = 4x(n)$$ [Equation 8]

-continued
$$X(4k+1) = x(n) - j \cdot x(n) - x(n) + j \cdot x(n) = 0$$
$$X(4k+2) = x(n) - x(n) + x(n) - x(n) = 0$$
$$X(4k+3) = x(n) + j \cdot x(n) - x(n) - j \cdot x(n) = 0$$

Referring to the Equation 8, by operating the interpolated 4096 data with the Radix-4 method, data exist in the addresses of X (4k) of the entire 4096 address structure only, while there is '0' data in the addresses of X (4k+1), X (4k+2) and X (4k+3). The operations for the entire stages will also have the 1024 input data re-stored only in the addresses of X (4k). Accordingly, the 1024 data corresponding to the addresses of X (4k) are re-stored in the memory 410.

Third, detailed descriptions will be made on an operation process based on the Radix-4 algorithm in the 256 mode with reference to FIG. 6A to FIG. 6C.

The address generator 300 generates 4096 addresses and stores in the memory 410 and the virtual memory interpolated 4096 data corresponding to the 4096 address structure. That is, in the 4096 address structure shown in (A) of FIG. 6, 256 data is eight times repeated and stored at the addresses from 0 to 2047, and 256 data is eight times repeated and stored at the addresses from 2048 to 4095 in the virtual memory acknowledged by the memory controller 450 only.

Figure 6:
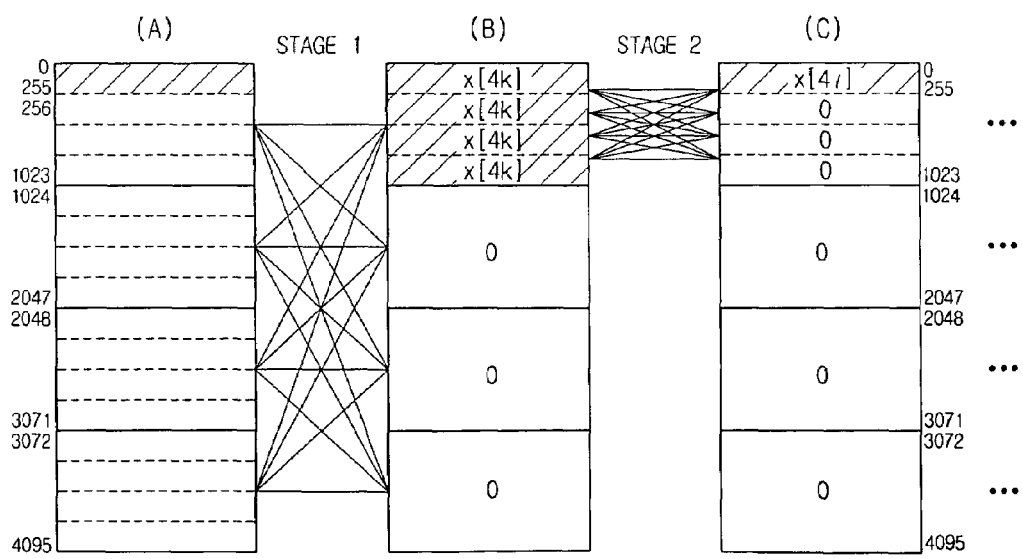
FIG. 6 is a view for showing the distributions of data stored in the memory 410 based on the Radix-4 algorithm in the case that the receiver of FIG. 1 has a 256 FFT mode.

As above, as shown in (A) of FIG. 6, 256 data is 16 times repeated to have the 4096 address structure depending upon an interpolation method, and the algorithm unit 430 implements the Radix-4 based butterfly operation accordingly. Referring to the operation results of the aforementioned 2048 and 1024 modes, it can be seen that the Radix-4 based operations are independently implemented by one fourth after one stage.

According to such a Radix-4 based operation property, the 4096 data in (A) of FIG. 6 is operated in one stage so that data exists at the addresses from 0 to 1023 only as shown in (B) of FIG. 6, which brings the same result as the operation result of the 1024 mode, as previously described (refer to (A) and (B) of FIG. 5). Accordingly, the operation result can be expressed in Equation 8, and, accordingly, data is re-stored in only the X (41) area addressed from 0 to 255 in the 4096 address structure, as shown in (C) of FIG. 6.

Fourth, detailed descriptions will be made on a Radix-4 based operation process in the 512 mode with reference to FIG. 7.

The address generator 300 generates 4096 addresses and stores interpolated 4096 data in the memory 410 and the virtual memory in correspondence to the 4096 address structure. That is, in the 4096 address structure as shown in (A) of FIG. 7, 512 data is repeated four times and stored at the addresses from 0 to 2047 , and the 512 data is also repeated four times and stored at the addresses from 2048 to 4095 in the virtual memory acknowledged by only the memory controller 450.

Figure 7:
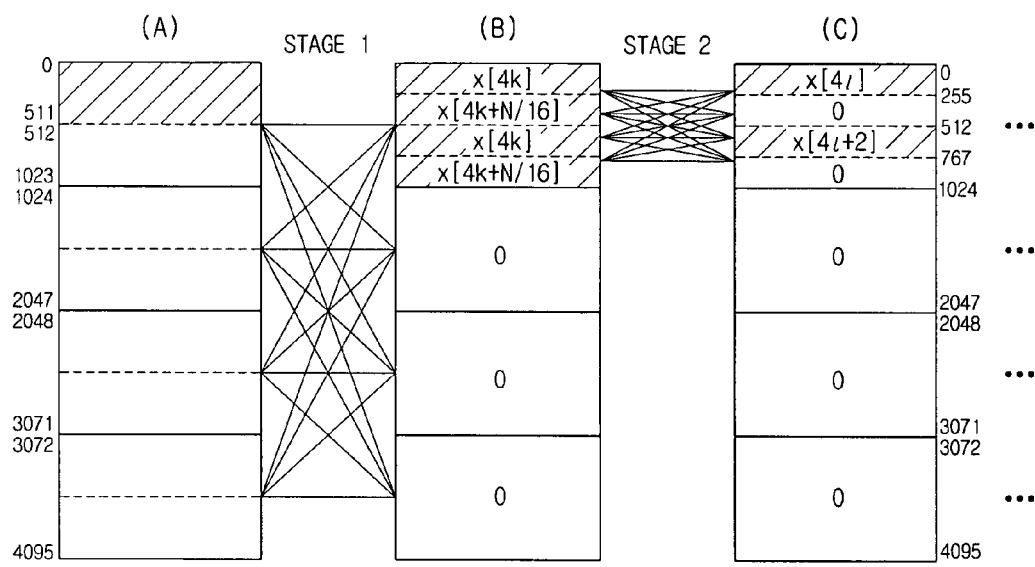
FIG. 7 is a view for showing the distributions of data stored in the memory 410 based on the Radix-4 algorithm in the case that the receiver of FIG. 1 has a 512 FFT mode.

As aforementioned, depending on interpolation operations, as shown in (A) of FIG. 7, the 512 data is repeated eight times to have the 4096 address structure, for which the algorithm unit 430 implements the Radix-4 based butterfly operations. With the Radix-4 based operation property, the 4096 data in the (A) of FIG. 7 exists at the addresses from 0 to 1023 as shown in (B) of FIG. 7 after one stage, stage 1, which is the same as the operation result of the aforementioned 2048 mode (refer to (A) and (B) of FIG. 4). Accordingly, the operation result can be expressed as in Equation 7, and, according to this, the data in the 4096 address structure is re-stored in X (4l) addressed from 0 to 255, and X (4l+2) addressed from 512 to 767 as shown in (C) of FIG. 7.

As stated above, with the application of interpolation operations to the fast Fourier transform, the input data in diverse FFT modes such as 2048, 1024, 256, and 512 is interpolated to 4096 data, and the same Radix-4 algorithm is implemented for the 4096 data, so that the implementation and operations of the fast Fourier transform unit (400) can be simplified. Further, if the data re-stored in the memory 410 and the virtual memory after the applications of the interpolation and the Radix-4 algorithm has blocks of data of "0", the blocks of "0" data are stored in the virtual memory. Accordingly, the increase of the memory 410 for the 4096 addresses can be also prevented.

[2] A digit-reverse process of the FFT unit is described as below.

Figure 8:
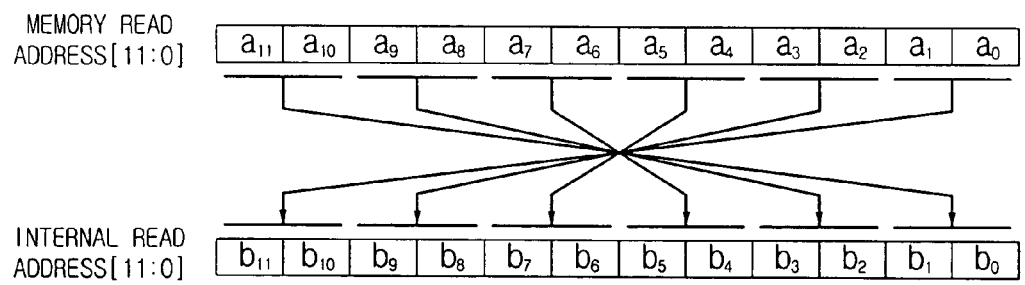
FIG. 8 is a conceptual view for explaining a digit-reverse process in case of digit-reversing 4096 data into the Radix-4 algorithm structure.

In general, in case of implementing the fast Fourier transform for 4096 data with the Radix-4 algorithm, the digit-reverse process is the same as shown in FIG. 8. In here, $\{a_{11}, a_{10}, a_9, a_8, a_7, a_6, a_5, a_4, a_3, a_2, a_1, a_0\}$ is a read address that the address generator 300 generates, and, for example, $a_2$ becomes a 3-bit value of the read address.

In the meantime, $\{b_{11}, b_{10}, b_9, b_8, b_7, b_6, b_5, b_4, b_3, b_2, b_1, b_0\}$ is an address digit-reversed for the read address, and the $b_2$ becomes a 3-bit value of the digit-reversed address.

Together with FIG. 8, descriptions will be made on the digit-reverse process for the data re-stored in the memory 410 based on respective FFT modes with reference to drawings.

First, referring to FIG. 9A to FIG. 9C, a digit-reverse process for the 2048 mode will be described.

Figure 9A:
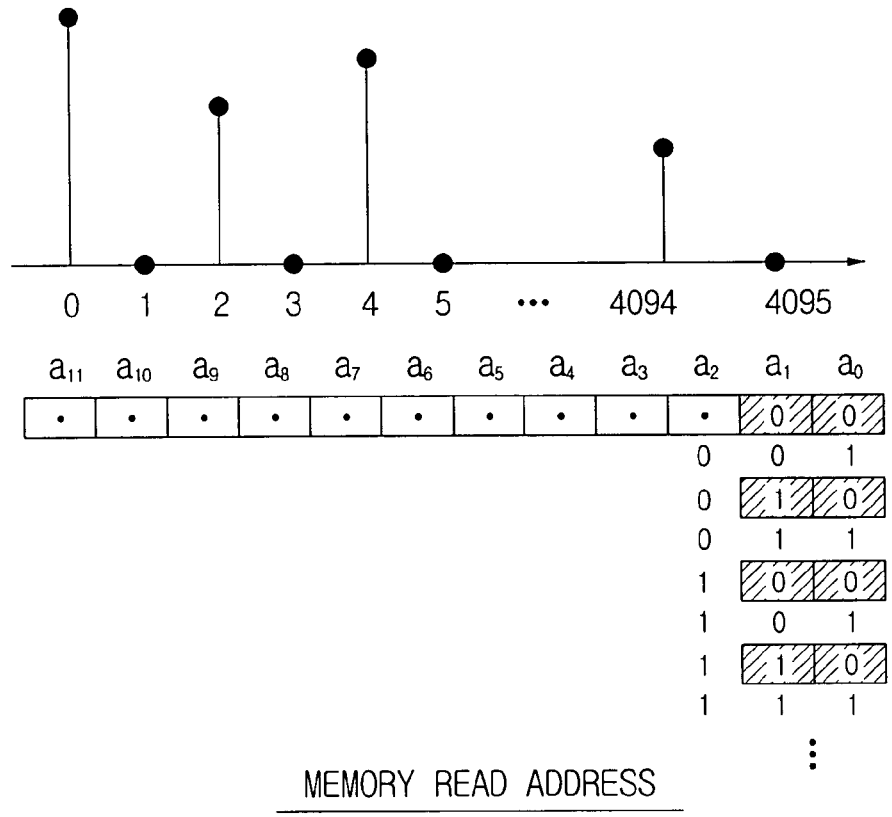
FIG. 9A to FIG. 9C are conceptual views for explaining a digit-reverse process in the case that the receiver of FIG. 1 has a 2048 FFT mode.

2048 input data are repeated to 4096 data, and the repeated 4096 data are fast-Fourier-transformed, to thereby have an interpolation format in which "0" data is inserted among 2048 data as shown in FIG. 9A. In the meantime, the address structure of data re-stored in the memory 410 as a result of the Radix-4 based operations for the 4096 data has a format in which data exists only at the addresses from 0 to 1024 and the addresses from 2048 to 3071 as shown in FIG. 9B.

That is, the data corresponding to the address (refer to "Memory read address" of FIG. 9A) read from the address generator 300 by the control of the controller 200 and the address of the memory 410 at which the data is substantially stored are different from each other, so that the digit-reverse process is implemented.

The lowest 2-bit values of $\{a_1, a_0\}$ of the memory read address generated from the address generator 300 are $\{0, 1\}$ and $\{1, 1\}$, which is a part with "0" inserted by the interpolation as shown in FIG. 9A, and the digit-reverse process is omitted with respect to the part.

Figure 9B:
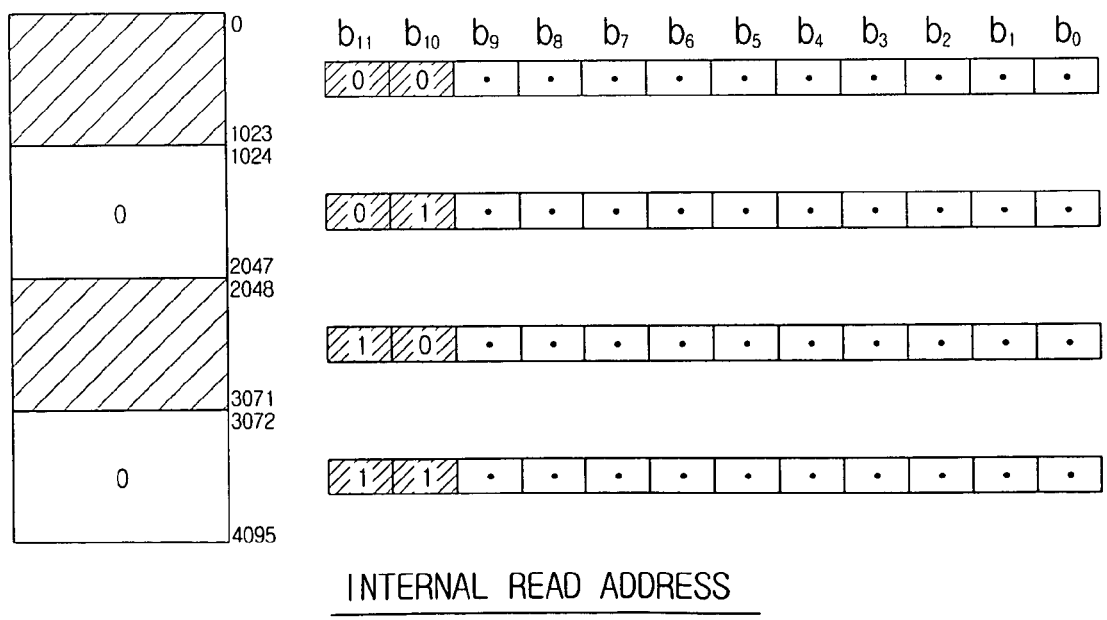

Meanwhile, if the lowest 2-bit value of $\{a_1, a_0\}$ of the memory read address read by the address generator 300 is $\{0, 0\}$ and digit-reversed, the highest 2-bit values of $\{b_{11}, b_{10}\}$ of the internal read address of the memory 410 become an area of $\{0, 0\}$ as shown in FIG. 9B. Accordingly, in the case that an address having a $\{0, 0\}$ as the lowest 2-bit value of $\{a_1, a_0\}$ is read, the memory controller 450 digit-reverses the highest 2-bit value of $\{b_{11}, b_{10}\}$ of the internal read address into an address of $\{0, 0\}$.

If a $\{1, 0\}$ as the lowest 2-bit value of $\{a_1, a_0\}$ of the memory read address is digit-reversed, the highest 2-bit value of $\{b_{11}, b_{10}\}$ of the internal read address of the memory 410 becomes an area of $\{1, 0\}$ as shown in FIG. 9B. However, the area of $\{1, 0\}$ as the value of $\{b_{11}, b_{10}\}$, is an address in the virtual memory area addressed from 2048 to 3071, so the addresses from 1024 to 2047 with 1024 addresses subtracted are digit-reversed. That is, in the case that the lowest 2-bit value of $\{a_1, a_0\}$ reads an address of $\{1, 0\}$, the memory controller 450 digit-reverses the highest 2-bit value of $\{b_{11}, b_{10}\}$ of the memory address into an address of $\{0, 1\}$.

Figure 9C:
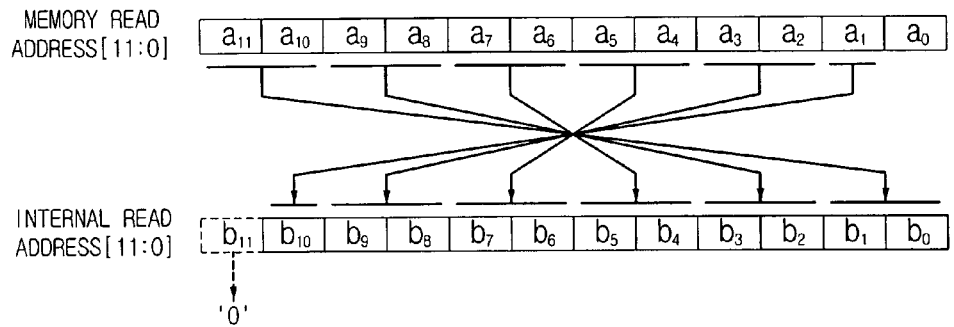

FIG. 9C is a conceptual view for showing a digit-reverse process for the 2048 mode, which shows the internal read address of the memory 410 digit-reversed by the memory controller 450 with respect to the memory read address read by the address generator 300 through the control of the controller 200. As shown in FIG. 9C, the digit-reversed address of the memory 410 has a "0" for a value of the highest bit of $\{b_{11}\}$ all the time. Accordingly, the internal read address can have an 11-bit address corresponding to the 2048 addresses, the size of the memory 410.

Second, descriptions are made on a digit-reverse process for the 1024 mode with reference to FIG. 1A to FIG. 10C.

Figure 10A:
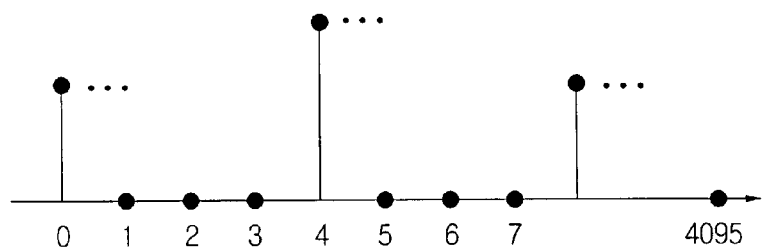
FIG. 10A to FIG. 10C are conceptual views for explaining a digit-reverse process in the case that the receiver of FIG. 1 has a 1024 FFT mode.
Figure 10A:
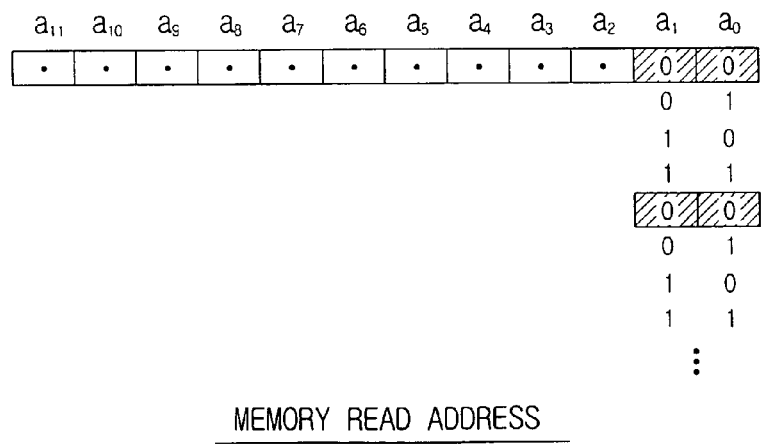

If the 1024 input data are repeated to 4096 data and the repeated 4096 data is fast-Fourier-transformed, an interpolation format is formed in which three "0" data is inserted among the 1024 data as shown in FIG. 10A. Meanwhile, as the Radix-4 algorithm is implemented with respect to the 4096 data, the address structure for data re-stored in the memory 410 is formed to have data existing among the addresses from 0 to 1023, as shown in FIG. 10B.

That is, the data corresponding to address (refer to "Memory read address" of FIG. 10A) read by the address generator 300 through the control of the controller 200 and the address of the memory 410 at which the data is substantially stored do not match each other, so that the digit-reverse process is implemented.

In the case that the values of the lowest 2 bits of $\{a_1, a_0\}$ of the memory read address read by the address generator 300 are $\{0, 1\}$, $\{1, 0\}$, and $\{1, 1\}$, the digit-reverse process is omitted since "0" is inserted by the interpolation as shown in FIG. 10A.

Figure 10B:
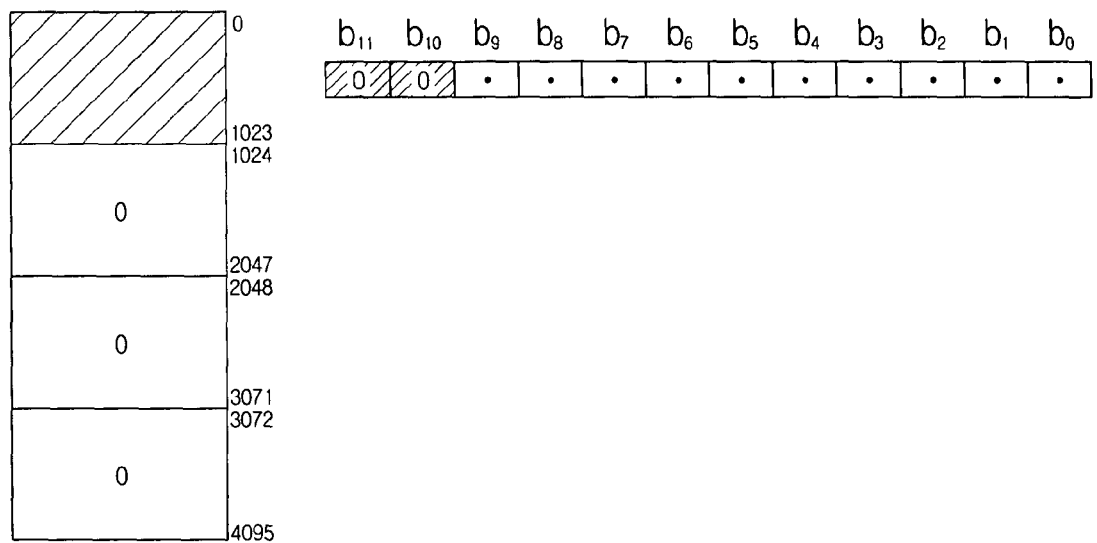

Meanwhile, if the digit-reverse process is implemented in the case that the lowest 2-bit value of $\{a_1, a_0\}$ of the memory read address is $\{0, 0\}$, the highest 2-bit value of $\{b_{11}, b_{10}\}$ of the address of the memory 410 as shown in FIG. 10B becomes an area of $\{0, 0\}$. Accordingly, in the case that the lowest 2-bit value of $\{a_1, a_0\}$ reads the address of $\{0, 0\}$, the memory controller 450 digit-reverses the highest 2-bit value of $\{b_{11}, b_{10}\}$ of the internal read address to an address of $\{0, 0\}$.

Figure 10C:
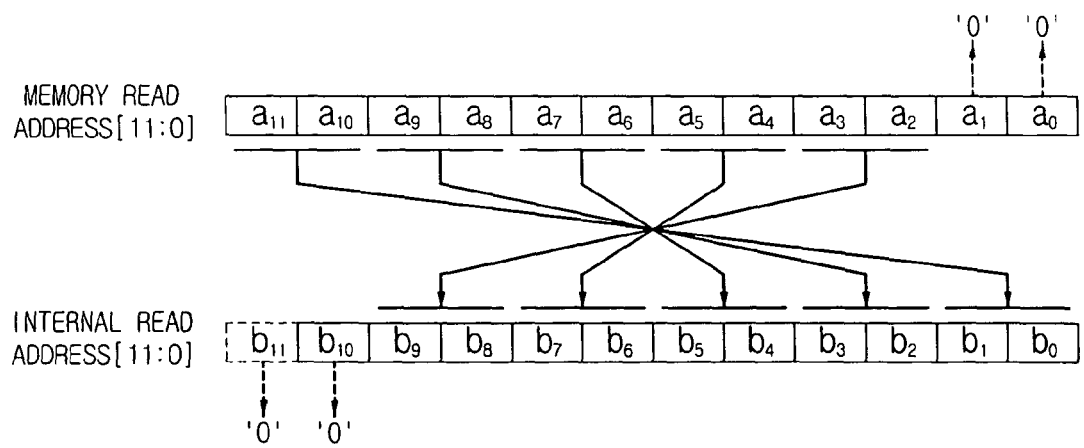

FIG. 10C is a conceptual view for showing a digit-reverse process for the 1024 mode, which shows the internal read address digit-reversed by the memory controller 450 with respect to the memory read address read by the address generator 300 through the control of the controller 200. As shown in FIG. 10C, the highest 2-bit value of $\{b_{11}, b_{10}\}$ of the digit-reversed address of the memory 410 becomes "0" all the time. Accordingly, the internal read address can have an 11-bit address corresponding to the 2048 addresses, the size of the memory 410.

Third, descriptions will be made on the digit-reverse process for the 256 mode with reference to FIG. 11A to FIG. 11C.

Figure 11A:
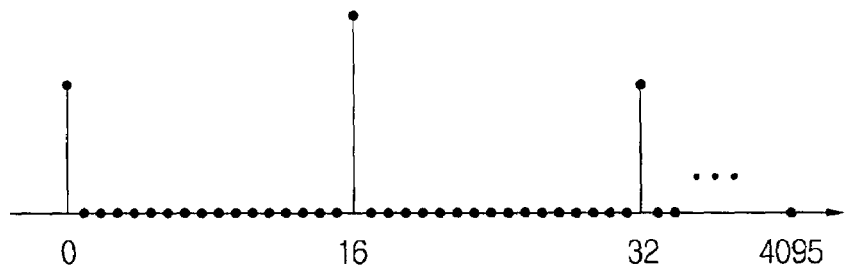
FIG. 11A to FIG. 11C are conceptual views for explaining a digit-reverse process in the case that the receiver of FIG. 1 has a 256 FFT mode.

If the 256 input data is repeated to the 4096 data and the repeated 4096 data is fast-Fourier-transformed, an interpolation format is formed in which 15 "0" data are inserted among the 256 data as shown in FIG. 11A. Meantime, as a result of the Radix-4 based operations with respect to the 4096 data, the address structure of the data re-stored in the memory 410 has a format in which data exists only at the addresses from 0 to 255 as shown in FIG. 11B.

That is, the data corresponding to the address (refer to the "Memory read address" of FIG. 11A) read by the address generator 300 through the control of the controller 200 and the address of the memory 410 (refer to the "Internal read address" of FIG. 11B) at which the data is substantially stored do not match each other, so that the digit-reverse process is implemented.

In the case that the lowest 4-bit values of $\{a_3, a_2, a_1, a_0\}$ of the memory read address read by the address generator 300 range from $\{0, 0, 0, 1\}$ to $\{1, 1, 1, 1\}$, the digit-reverse process is omitted since "0" is inserted by the interpolation as shown in FIG. 11A.

Figure 11B:
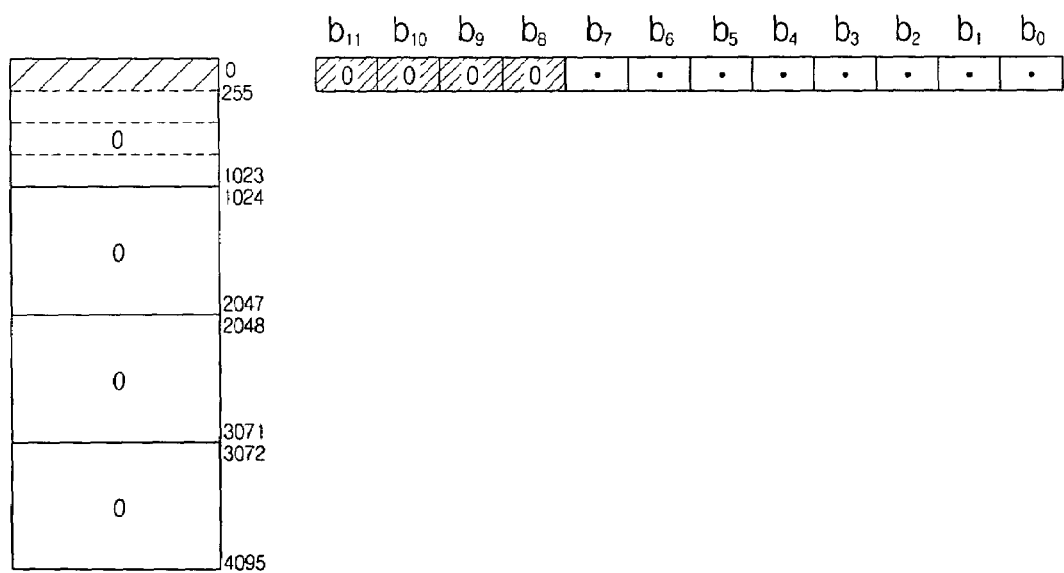

In the meantime, if the lowest 4-bit value of $\{a_3, a_2, a_1, a_0\}$ of the memory read address is $\{0, 0, 0, 0\}$ and the digit-reverse process is implemented, the highest 4-bit value of $\{b_{11}, b_{10}, b_9, b_8\}$ of the address of the memory 410 (internal read address) shown in FIG. 11B becomes an area of $\{0, 0, 0, 0\}$. Accordingly, in the case that the lowest 4-bit value of $\{a_3, a_2, a_1, a_0\}$ reads $\{0, 0, 0, 0\}$, the memory controller 450 digit-reverses the highest 4-bit value of $\{b_{11}, b_{10}, b_9, b_8\}$ of the memory address (internal read address) to an address of $\{0, 0, 0, 0\}$.

Figure 11C:
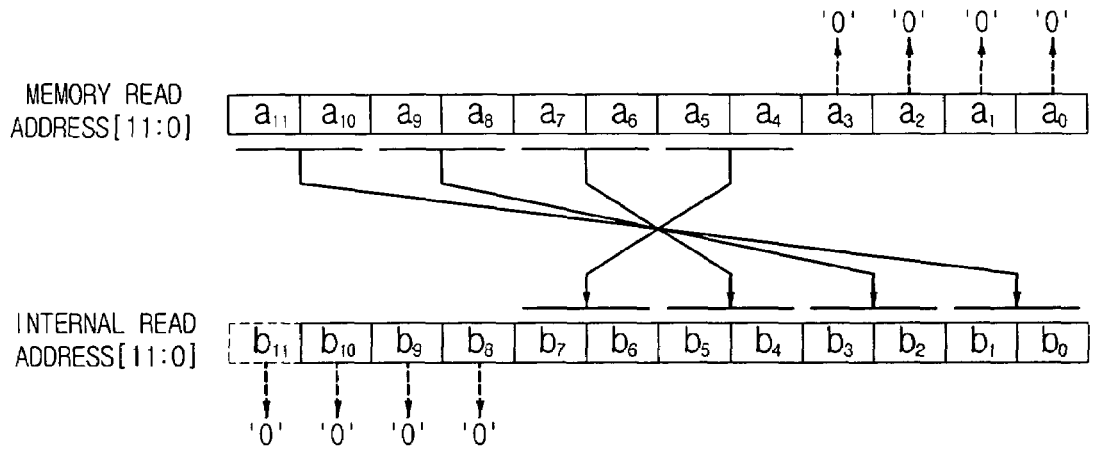

FIG. 11C is a conceptual view for showing a digit-reverse process for the 256 mode, which shows the address of the memory 410 (the internal read address) digit-reversed by the memory controller 450 with respect to the memory read address read by the address generator 300 through the control of the controller 200. As shown in FIG. 11C, the highest bit value of $\{b_{11}\}$ of the digit-reversed address of the memory 410 becomes "0" all the time. Accordingly, the memory address (the internal read address) can have an 11-bit address corresponding to the 2048 addresses, the size of the memory 410.

Fourth, descriptions will be made on the digit-reverse process for the 512 mode with reference to FIG. 12A to FIG. 12C.

Figure 12A:
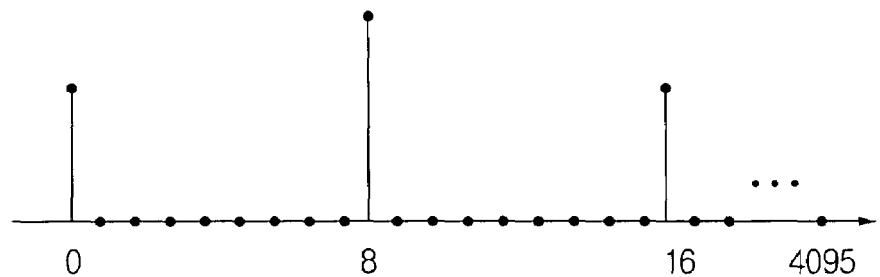
FIG. 12A to FIG. 12C are conceptual views for explaining a digit-reverse process in the case that the receiver of FIG. 1 has a 512 FFT mode.
Figure 12A:
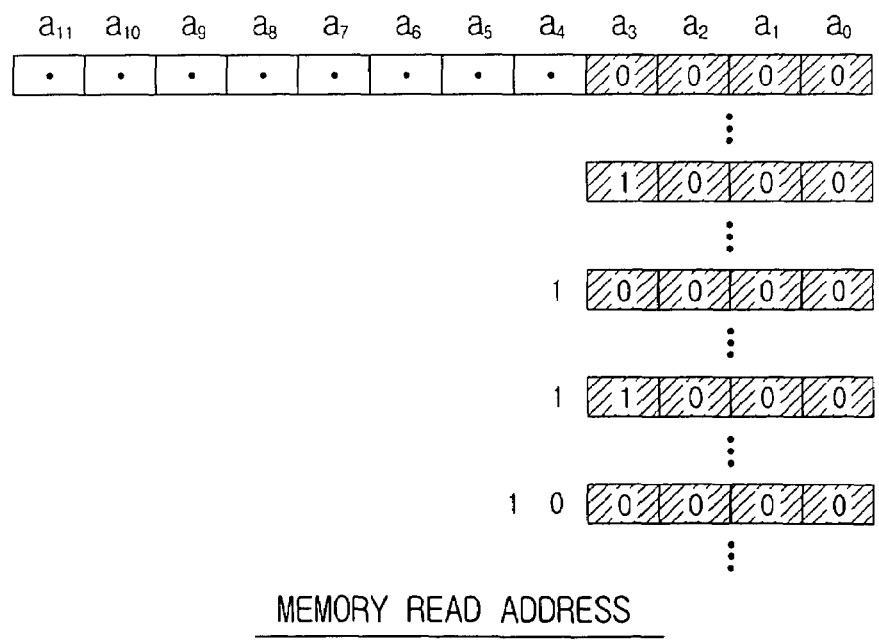

If the 512 input data are repeated to the 4096 data and the repeated 4096 data are fast-Fourier-transformed, an interpolation format is formed in which 7 "0" data are inserted among the 512 data as shown in FIG. 12A. Meantime, as a result of the Radix-4 based operations with respect to the 4096 data, the address structure of the data re-stored in the memory 410 has a format in which data exists only at the addresses from 0 to 255 and from 512 to 767 as shown in FIG. 12B.

That is, the data corresponding to the address (refer to the "Memory read address" of FIG. 12A) read by the address generator 300 through the control of the controller 200 and the address of the memory 410 (refer to the "Internal read address" of FIG. 12B) at which the data is substantially stored do not match each other, so that the digit-reverse process is implemented.

In the case that the values of $\{a_3\}$ of the 11 bits of the address (the memory read address) read by the address generator 300 are $\{0\}$ and $\{1\}$, data exits, and the other addresses are ones in which "0" data is inserted by the interpolation. Accordingly, the digit-reverse process is omitted with respect to the address at which "0" data is inserted.

Figure 12B:
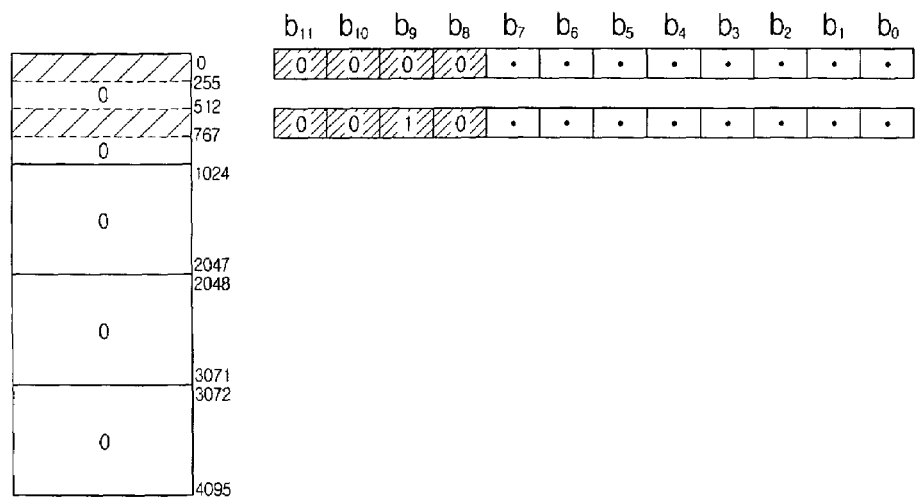

In the meantime, if the $\{a_3\}$ value of the lowest 4-bit value of $\{a_3, a_2, a_1, a_0\}$ of the memory read address is $\{0\}$ and $\{1\}$ and the digit-reverse process is implemented, the highest 4-bit value of $\{b_{11}, b_{10}, b_9, b_8\}$ of the address of the memory 410 (internal read address) shown in FIG. 12B becomes an area of $\{0\}$ and $\{1\}$, that is, the addresses from 0 to 255 and from 514 to 767. Accordingly, in the case that an address $\{a_3, 0, 0, 0\}$ of the lowest 4-bit value of $\{a_3, a_2, a_1, a_0\}$ is read, the memory controller 450 digit-reverses the highest 4-bit value of $\{b_{11}, b_{10}, b_9, b_8\}$ of the memory address (internal read address) to an address of $\{0, 0, b_9, 0\}$.

Figure 12C:
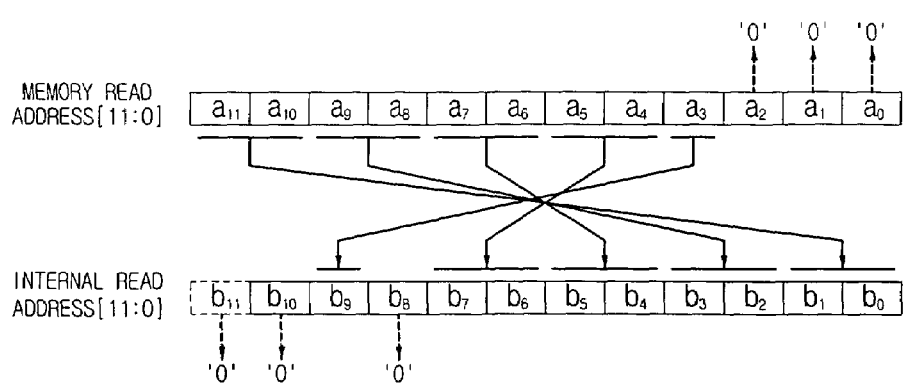
Figure 13:
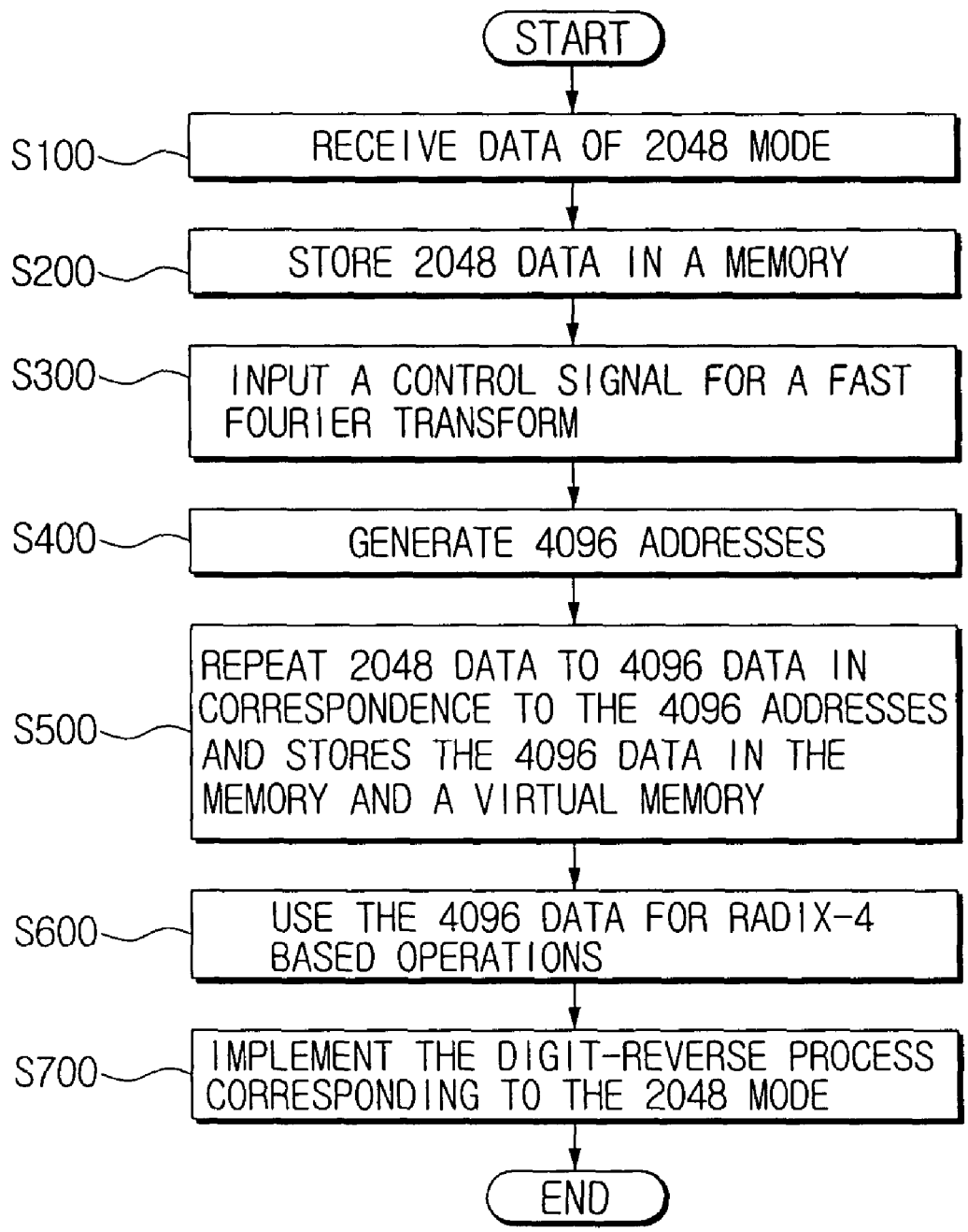
FIG. 13 is a flow chart for explaining an operation method for a European digital audio broadcast receiver according to an embodiment of the present invention.

FIG. 12C is a conceptual view for showing a digit-reverse process for the 512 mode, which shows the address of the memory 410 (the internal read address) digit-reversed by the memory controller 450 with respect to the memory read address read by the address generator 300 through the control of the controller 200. As shown in FIG. 12C, the highest bit value of $\{b_{11}\}$ of the digit-reversed address of the memory 410 becomes "0" all the time. Accordingly, the memory address (the internal read address) can have an 11-bit address corresponding to the 2048 addresses, the size of the memory 410.

As described above, data stored in the memory 410, mode by mode, can be read by using the digit-reverse process corresponding to FFT modes.

Hereinafter, an illustrative operation process for a European digital audio broadcast receiver according to the present invention is described with the 2048 mode of the FFT modes.

First, if 2048 data is received in the 2048 mode (S100), the controller 200 stores the 2048 data in the memory 410 for the fast Fourier transform (S200). Thereafter, a control signal is inputted to the address generator 300 and the fast Fourier transform unit 400 to implement a fast Fourier transform (S300). Accordingly, the address generator 300 generates the 4096 addresses (S400), and the memory controller 450 interpolates the 2048 data into 4096 data corresponding to the 4096 addresses and stores the interpolated 4096 data in the memory 410 and the virtual memory of the memory controller 450 (S500).

As shown above in (A) of FIG. 4, the 2048 data is twice repeated and stored in the 4096 address structure. The algorithm unit 430 applies and implements the Radix-4 algorithm based on the 4096 data (S600). That is, as shown in (B) of FIG. 4, the 2048 data is distributed at the addresses from 0 to 1023 and from 2048 to 3071, and 0 data blocks are distributed at the addresses from 1024 to 2047 and from 3072 to 4095. As a result of the Radix-4 algorithm based operations on the repeated 4096 data, "0" data blocks are stored so that the increase of the memory 410 can be prevented. Further, since the "0" data does not affect the operation result any more, the data stored in the memory 410 after as many times repetitive operations as $\log_4$ (FFT size) becomes the same as shown in (B) of FIG. 4.

If the Radix-4 based operations are completed, the address generator 300 generates the memory read address by the control of the controller 200. At this time, the memory read address is different from the memory address (internal read address) at which data is operated based on the Radix-4 algorithm and substantially stored in the memory 410, so that the memory controller 450 implements a digit-reverse process (S700). As shown above in FIG. 9A and FIG. 9B, the memory read address and the memory address (internal read address) are different so that the digit-reverse process is implemented in the manner shown in FIG. 9C. Accordingly, the 2048 data corresponding to the 2048 mode are read and outputted so that the fast Fourier transform is completed. Of course, the same operation process is applied to 1024, 256, and 512 modes.

As stated above, the fast Fourier transform process for a European digital audio broadcast receiver according to a preferred embodiment of the present invention has properties as follows.

First, the respective 2048, 1024, 256, and 512 input data FFT modes are repeated to 4096 data to implement the fast Fourier transform so that output data has an interpolation format, and the same Radix-4 based operation is implemented with respect to the respective FFT modes for the fast Fourier transform. Therefore, the size increase of the memory 410 for the 4096 data can be prevented, to thereby maintain the existing memory size. Accordingly, the implementation and operation control of the fast Fourier transform unit are simplified.

Second, as in the embodiments, the respective digit-reverse processes are applied with respect to the 2048, 1024, 256, and 512 FFT modes so that the FFT modes can be digit-reversed. Accordingly, the implementation and operation control of the fast Fourier transform unit become simplified.

The present invention has the same fast Fourier transform unit for the 2048, 1024, 256, and 512 FFT modes of European digital audio broadcasts so its hardware implementation is simplified.

Further, the implementation of the fast Fourier transform having the same structure for the respective FFT modes simplifies the operation controls of the fast Fourier transform.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A European digital audio broadcast receiver having diverse fast Fourier transform (FFT) modes based on sizes of transmitted data, comprising:
   an address generator for generating a number of write addresses, wherein the number of write addresses is determined prior to the European digital audio broadcast receiver receiving the transmitted data;
   a fast Fourier transform (FFT) processor for repeating data of FFT modes to generate a predetermined number of data and implementing a fast Fourier transform (FFT) by using the predetermined number of data; and
   a controller for controlling the address generator to generate a number of read addresses according to operations of the FFT processor,
   wherein the number of write addresses generated by the address generator is independent of the sizes of the transmitted data.

2. The receiver as claimed in claim 1, wherein the predetermined number of data is 4096, and the FFT processor uses the 4096 data to implement the fast Fourier transform.

3. The receiver as claimed in claim 1, wherein the FFT processor includes:
   a memory controller for repeating the data of FFT modes to generate 4096 data;
   a memory having a size capable of storing 2048 data; and
   an algorithm unit for using the 4096 data and implementing Radix-4 based operations on the 4096 data to generate Radix-4 implemented data that is stored in the memory, and,
   in the case that the read addresses are generated, the memory controller digit-reverses the addresses of the memory to correspond to the generated read addresses.

4. The receiver as claimed in claim 3, wherein the memory controller has a virtual memory storing data other than the 2048 data stored in the memory in order for the algorithm unit to implement the Radix-4 based operations.

5. The receiver as claimed in claim 4, wherein the algorithm unit implements the Radix-4 based operations, and, accordingly, "0" data blocks are stored in the virtual memory in correspondence to the FFT modes.

6. The receiver as claimed in claim 3, wherein the memory controller digit-reverses the Radix-4 implemented data stored in the memory corresponding to the FFT modes.

7. The receiver as claimed in claim 3, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 2048 FFT mode, the memory controller digit-reverses the bit array of the memory addresses from the highest bit to the lowest bit into $\{a_1, a_3, a_2, a_5, a_4, a_7, a_6, a_9, a_8, a_{11}, a_{10}\}$.

8. The receiver as claimed in claim 3, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 1024 FFT mode, the memory controller digit-reverses the bit array of the memory addresses from the highest bit to the lowest bit into $\{0, a_3, a_2, a_5, a_4, a_7, a_6, a_9, a_8, a_{11}, a_{10}\}$.

9. The receiver as claimed in claim 3, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 256 FFT mode, the memory controller digit-reverses the bit array of the memory addresses from the highest bit to the lowest bit into $\{0, 0, 0, a_5, a_4, a_7, a_6, a_9, a_8, a_{11}, a_{10}\}$.

10. The receiver as claimed in claim 3, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 512 FFT mode, the memory controller digit-reverses the bit array of the memory addresses from the highest bit to the lowest bit into $\{0, a_3, 0, a_5, a_4, a_7, a_6, a_9, a_8, a_{11}, a_{10}\}$.

11. An operation method for a European digital audio broadcast receiver having diverse FFT modes based on sizes of transmitted data, comprising:
    generating a number of write addresses, wherein the number of write addresses is determined prior to the European digital audio broadcast receiver receiving the transmitted data;
    repeating data of FFT modes to generate a predetermined number of data in correspondence to the generated write addresses,
    implementing a fast Fourier transform (FFT) by using the predetermined number of data; and
    generating read addresses if the implementing the FFT is completed,
    wherein the generating the number of write addresses comprises generating the number of write addresses independent of the sizes of the transmitted data.

12. The operation method as claimed in claim 11, wherein the predetermined number of data is 4096, and the implementing the FFT uses the 4096 data to implement the fast Fourier transform.

13. The operation method as claimed in claim 11, wherein the implementing the FFT includes:
    repeating the data of FFT modes to generate 4096 data;
    using the generated 4096 data to implement Radix-4 based operations to generate Radix-4 implemented data, and storing the Radix-4 implemented data in a memory in correspondence to write addresses of the memory; and
    in the case that the read addresses are generated, digit reversing the addresses of the memory to correspond to the generated read addresses.

14. The operation method as claimed in claim 13, further comprising:
    storing the Radix-4 implemented data in the memory and a virtual memory,
    wherein the memory is capable of storing 2048 data.

15. The operation method as claimed in claim 14, wherein the using the 4096 data implements the Radix-4 based operations, and, accordingly, "0" data blocks are stored in the virtual memory in correspondence to the FFT modes.

16. The operation method as claimed in claim 13, wherein the digit-reversing digit-reverses the addresses of the Radix-4 implemented data stored in the memory corresponding to the FFT modes.

17. The operation method as claimed in claim 13, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 2048 FFT mode, the digit-reversing digit-reverses the bit array of the memory addresses from the highest bit to the lowest bit into $\{a_1, a_3, a_2, a_5, a_4, a_7, a_6, a_9, a_8, a_{11}, a_{10}\}$.

18. The operation method as claimed in claim 13, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 1024 FFT mode, the digit-reversing digit-reverses the bit array of the memory addresses from the highest bit to the lowest bit into $\{0, a_3, a_2, a_5, a_4, a_7, a_6, a_9, a_8, a_{11}, a_{10}\}$.

19. The operation method as claimed in claim 13, wherein, in the case that a bit array of the read addresses from a highest bit to a lowest bit has $\{a_{11}, a_{10}, a_9, a_8, a_7, a_6, a_5, a_4, a_3, a_2, a_1, a_0\}$ in 256 FFT mode, the digit-reversing digit-reverses the bit array of the memory addresses from the highest bit to the lowest bit into $\{0, 0, 0, a_5, a_4, a_7, a_6, a_9, a_8, a_{11}, a_{10}\}$.

20. The operation method as claimed in claim 13, wherein, in the case that a bit array of the read addresses from a highest bit to a lowest bit has $\{a_{11}, a_{10}, a_9, a_8, a_7, a_{6, a5}, a_4, a_3, a_2, a_1, a_0\}$ in 512 FFT mode, the digit-reversing digit-reverses the bit array of the memory addresses from the highest bit to the lowest bit into $\{0, a_3, 0, a_5, a_4, a_7, a_6, a_9, a_8, a_{11}, a_{10}\}$.

21. A receiver for processing data, the receiver comprising:
a receiving circuit that receives data;
a generating circuit that generates a number of write addresses if the receiving circuit receives the data, wherein the number of write addresses is determined prior to the receiving circuit receiving the data;
a processing circuit that processed the received data through fast Fourier transform modes to generate a first number of data corresponding to the generated predetermined number of write addresses, wherein the processing is repeated based on a size of the received data;
a fast Fourier transform circuit that implements a fast Fourier transform using the generated first number of data; and
a control circuit that controls the generating circuit to generate a number of read addresses according to operations of the fast Fourier transform circuit,
wherein the number of write addresses generated by the generating circuit is independent of a number of the data received by the receiving circuit.

22. A method for processing data in a receiver, the method comprising:
receiving data by a receiver;
generating a number of write addresses if the receiver receives the data, wherein the number of write addresses is determined prior to the receiving the data by the receiver;
processing the received data through fast Fourier transform modes to generate a first number of data corresponding to the generated predetermined number of write addresses, wherein the processing is repeated based on a size of the received data;
implementing a fast Fourier transform using the generated first number of data; and
generating read addresses if the implementing the fast Fourier transform is completed,
wherein the generating the number of write addresses comprises generating the number of write addresses independent of a number of the received data.

* * * * *